(12) United States Patent
Venkitasubramani et al.

(10) Patent No.: US 10,972,744 B2
(45) Date of Patent: Apr. 6, 2021

(54) IMAGE SCALING

(71) Applicant: Analog Devices International Unlimited Company, Limerick (IE)

(72) Inventors: Anand Venkitasubramani, Trivandrum (IN); Bhavana Muralikrishna, Bangalore (IN); Shreeja Sugathan, Kerala (IN); Niall D. O'Connell, Clarina (IE)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 141 days.

(21) Appl. No.: 16/188,209

(22) Filed: Nov. 12, 2018

(65) Prior Publication Data

US 2020/0154120 A1 May 14, 2020

(51) Int. Cl.
*H04N 19/33* (2014.01)
*H04N 7/01* (2006.01)
*H04N 19/436* (2014.01)
*H04N 19/174* (2014.01)

(52) U.S. Cl.
CPC ............ *H04N 19/33* (2014.11); *H04N 7/0117* (2013.01); *H04N 7/0125* (2013.01); *H04N 7/0135* (2013.01); *H04N 19/174* (2014.11); *H04N 19/436* (2014.11)

(58) Field of Classification Search
CPC .... H04N 19/33; H04N 19/436; H04N 19/174; H04N 7/0117; H04N 7/0125; H04N 7/0135
See application file for complete search history.

(56) References Cited

U.S. PATENT DOCUMENTS

| | | | | |
|---|---|---|---|---|
| 5,777,681 A | * | 7/1998 | Kim | H04N 19/433 375/240.16 |
| 5,949,490 A | * | 9/1999 | Borgwardt | H04N 19/159 375/240.05 |
| 6,832,009 B1 | | 12/2004 | Shezaf et al. | |
| 8,159,606 B2 | | 4/2012 | Sole et al. | |
| 9,307,191 B2 | | 4/2016 | Berrett et al. | |
| 9,349,072 B2 | | 5/2016 | Sun et al. | |
| 9,405,446 B1 | * | 8/2016 | Haitani | G06F 3/04842 |
| 9,992,805 B2 | | 6/2018 | Joshi | |
| 10,120,187 B2 | * | 11/2018 | Wittenbrink | G06F 3/14 |
| 2002/0009287 A1 | * | 1/2002 | Ueda | H04N 19/61 386/283 |
| 2004/0183817 A1 | | 9/2004 | Kaasila | |
| 2006/0139379 A1 | * | 6/2006 | Toma | G09G 5/36 345/698 |
| 2007/0002946 A1 | * | 1/2007 | Bouton | H04N 19/115 375/240.01 |

(Continued)

*Primary Examiner* — James M Pontius
(74) *Attorney, Agent, or Firm* — Patent Capital Group

(57) ABSTRACT

There is disclosed in one example a video processor, including: an input buffer to receive an input image; a slicer circuit to divide the input image into a plurality of N vertical slices; N parallel input buffers for de-rasterization; N parallel image scalers, wherein each scaler is hardware configured to scale in a raster form, one of the N vertical slices according to an image scaling algorithm; N parallel output buffers for rasterizition; and an output multiplexer to combine the scaled vertical slices into a combined scaled output image.

20 Claims, 11 Drawing Sheets

(56) References Cited

U.S. PATENT DOCUMENTS

| | | | |
|---|---|---|---|
| 2008/0137736 A1* | 6/2008 | Richardson | H04N 19/177 375/240.03 |
| 2011/0001643 A1* | 1/2011 | Sze | H04N 19/91 341/87 |
| 2011/0078236 A1 | 3/2011 | Olsen, Jr. et al. | |
| 2012/0275516 A1* | 11/2012 | Tanaka | H04N 19/82 375/240.12 |
| 2013/0322723 A1* | 12/2013 | Akhbardeh | G06T 7/337 382/131 |
| 2014/0028876 A1* | 1/2014 | Mills | H04N 5/23267 348/231.99 |
| 2014/0064386 A1* | 3/2014 | Chen | H04N 19/187 375/240.29 |
| 2014/0321529 A1* | 10/2014 | Jung | H04N 7/12 375/240.02 |
| 2016/0085366 A1 | 3/2016 | Chi et al. | |
| 2017/0064308 A1* | 3/2017 | Lin | H04N 19/15 |
| 2019/0325252 A1* | 10/2019 | Griffin, IV | G06K 9/6285 |

* cited by examiner

IMAGE SCALING

TECHNICAL FIELD OF THE DISCLOSURE

This disclosure relates in general to the field of computing, and more particularly, though not exclusively, to a system and method for video processing.

BACKGROUND

Modern video systems are capable of receiving and rendering high quality digital video via interfaces such as high-definition multimedia interface (HDMI), DisplayPort, Universal Serial Bus Type C (USB-C), and Digital Video Interface (DVI), by way of nonlimiting example.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY

Figure 1A:
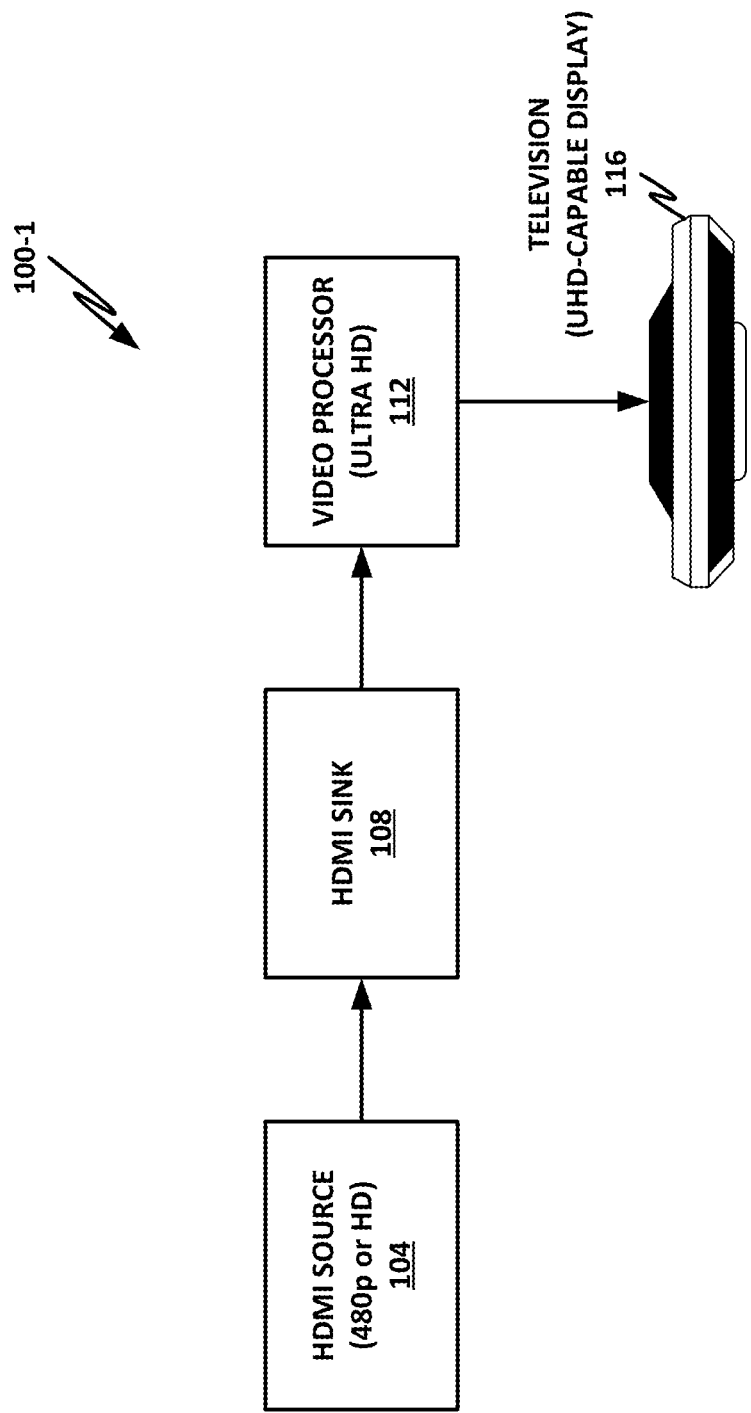
FIGS. 1a and 1b are illustrations of various embodiments of a video system, according to the teachings of the present specification.

In an example, there is disclosed a video processor, including: an input buffer to receive an input image; a slicer circuit to divide the input image into a plurality of N vertical slices; N parallel image scalers, wherein each scaler is hardware configured to linewise scale one of the N vertical slices according to an image scaling algorithm; and an output multiplexer to combine the scaled vertical slices into a combined scaled output image.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples, or in some cases across different figures. This repetition is for the purpose of simplicity and clarity and does not in itself dictate a specific relationship between the various embodiments and/or configurations discussed. Different embodiments may have different advantages, and no particular advantage is necessarily required of any embodiment.

Many contemporary display systems outstrip their data sources in terms of display resolution, color depth, and frame rate. For example, newer television sets are capable of 4K and 8K Ultra-High definition (UHD) display. These display technologies are so capable as to test the boundaries of human-perceptible sight. But often times, these displays are driven by previous-generation display sources that cannot take full advantage of the display capabilities. For example, many consumers have a first-generation Blu-ray disc player. Most commodity Blu-ray disc players display video at high-definition (HD) (e.g., 720p) or so-called full HD (1080p). The "p" in 720p and 1080p refers to a progressive scan (or "non-interlaced") HD signal format. 720p HD displays 1,280 pixels across a screen horizontally and 720 horizontal pixels down the screen vertically, resulting in 720 horizontal lines with an aspect ratio of 16 to 9. 1080p full HD displays 1,920 pixels across a screen horizontally and 1080 horizontal pixels down the screen vertically, yielding 1080 horizontal lines with an aspect ratio of 16 to 9. As compared to the informal but commonly-referenced designations of 720i and 1080i, wherein the "i" refers to an interlaced HD signal format, 720p and 1080p reduce the need to prevent image flicker by transmitting all the lines instead of only alternate lines in a frame.

Although Blu-ray disc players are capable of providing 720p HD and 1080p full HD, they are also capable of playing older digital video discs (DVDs). Many users still have a large collection of existing DVDs that they are not willing to replace with Blu-ray discs. DVDs are even more limited, with a maximum resolution of 480p (720×480 pixels).

Compare these resolutions to a 4K UHD television, which provides 3840×2160 resolution, or an 8K UHD television, which provides 7680×4320 resolution.

These resolutions are so high that a standard Blu-ray disc does not have the data capacity to store a 4K or 8K video. Thus, in the current environment, 4K and 8K are generally considered video streaming technologies. But modern consumers expect video to stream in real time, and to play on their televisions with little to no buffering. 4K and 8K video may not be able to stream successfully unless the user has a very high-end Internet connection, such as a fiber optic service. Thus, consumers with 4K and 8K UHD-capable televisions are faced with a highly-capable display, but a large number of video sources that are unable to drive that display at its full resolution.

Many existing televisions have the ability to support video streams from legacy devices at lower resolutions, such as 480p DVDs, or 720p and 1080p Blu-ray disc players. But consumers may be dissatisfied with watching grainy, low-resolution video on a high resolution television for which they paid a premium.

To provide consumers of such televisions with a premium viewing experience, many televisions now have a video upscale capability. For example, these televisions may receive a 1080p input stream, and upscale this stream to 4K UHD resolution. However, as resolution increases to 8K and beyond, such upscaling can tax the abilities of the types of microprocessors, digital signal processors (DSPs), or hardware such as application-specific integrated circuits (ASICs) that are used to provide the upscaling.

For example, processing a video at 8K UHD and 60 frames per second requires processing approximately 2.4 gigapixels per second. But common DSPs that are used for such processing operate at approximately 700 megapixels per second. Designing even larger or faster DSPs or conversion hardware is a nontrivial task.

The present specification illustrates a system and method for providing upscaling or downscaling of a video to an HD format by dividing the video stream into a plurality of N vertical slices, and processing the N vertical slices in parallel on N parallel scaler hardware elements or DSPs. Downscaling may be supported when the content in the source is high resolution (such as 8K) and the source lacks downscaling capability, but the display is capable of only a lower resolution, such as 1080p or 4K. In that case, a downscaler may need to be disposed between the source and the display.

Throughout this specification, examples will be discussed in terms of a high-definition multimedia interface (HDMI) receiver that upscales video to 8K in four parallel scalers. All of these examples should be understood as nonlimiting examples. In other embodiments, other video standards may be used, as well as other interconnects. For example, video could be delivered via a digital delivery system such as via the Internet, or via other interfaces such as a universal serial bus (USB), USB-C, display port, or similar. Furthermore, the teaching of upscaling video in this specification should not be understood to be an exclusive function of a video signal processor provided herein. A video signal processor may provide many kinds of video signal processing, including other services such as color space conversion, cropping, deinterlacing, and frame rate conversion, by way of illustrative and nonlimiting example.

Embodiments of the present specification may include an ASIC or a system-on-a-chip (SoC) including the N parallel scalers taught herein, as well as other elements such as de-rasterization buffers, re-rasterization buffers, HDMI controllers, double data rate (DDR) controllers, physical and logical interfaces, and any other suitable elements. The scalers discussed herein may in some examples be provided as intellectual property (IP) blocks. An IP block that includes a scaler could include only the scaler, or may include support elements configured specifically to adapt the scaler for use in the teachings of the present specification. For example, an IP block may include not only the scaler, but also support elements such as a pixel converter, a de-rasterization buffer, a re-rasterization buffer, and/or an output multiplexer. In some cases, the N scalers may be provided monolithically as a parallel scaler unit. In that case, the scaler may be provided as an IP block, a separate ASIC, or a portion of an integrated circuit. Furthermore, while custom circuitry is used as an example of a scaler in the present specification, scalers of the present specification can also be built using DSPs, graphical processing units (GPUs), central processing units (CPUs), or other suitable processing elements.

The parallel scaler of the present specification includes, by way of nonlimiting and illustrative example, four independent scalers that operate at approximately 600 to 700 MHz. These four independent scalers together provide a total of 2.4 gigapixels per second of image processing power, thus enabling scaling up video, including 480p, 720p, 1080p, and 4K, up to 8K in real time. Furthermore, with a cooperative deinterlacer, a system according to the present specification may also upscale other video formats, such as 480i, 720i, and 1080i.

An illustrative embodiment of the scaler of the present specification provides four parallel scalers, each of which provides substantially the same image scaling algorithm. The image scaling algorithm may be a polynomial interpolation algorithm, which provides high quality image scaling by calculating not just a linear approximation between two points, but rather by interpolating a curve based on four points of input data. Each point of input data may be an individual pixel. Thus, the scaler may take one line of input pixels and divide that line into four parallel chunks, each chunk containing approximately 2000 pixels. These 2000-pixel chunks are then processed in turn by the four parallel scalers, and each scaler then receives a chunk from the next line after outputting its interpolated pixels to an output first in, first out (FIFO) buffer. The output images may be multiplexed together, re-rasterized, and then driven out to a video display at full 8K UHD resolution.

To ensure that the FIFO buffers for each scaler do not become empty, the image scalers may be pipelined. All slice scalers work at the same time in parallel. At the start of the image, they start at quarter line offsets, assuming the input is in a raster format. This quarter offset delay is to more nearly optimize the de-rasterization and re-rasterization buffer sizes. In contrast, if the input were stored as a file in a filesystem, all slice scalers could start together at the start of the frame. But for real-time operation, the rerasteriztion buffer size is better if the scalers start at quarter line offsets. In that case, input de-rasterization buffers may not be necessary.

With the image being sliced into four vertical slices, and each slice being processed independently by its own scaler, there is danger that the image could appear to be four discrete images, with a line in between each slice. This may be considered a suboptimal viewing experience from the end user perspective, and it is preferable in many cases to provide one continuous image that appears as though it was originally coded as a single 8K UHD image. To accomplish this, each scaler may receive as its first input for a particular quartile on a given line one or more previous pixels from the preceding quartile. For example, if a bilinear interpolation is being used, then scaler 2 would receive as its first input pixel the last pixel of quartile 1. Thus, the scaler would be able to interpolate a weighted average based on the distance of a new pixel from the two surrounding pixels. For a better display experience, rather than a bilinear interpolation being used, a polynomial interpolation such as a bicubic interpolation may be used. A bicubic interpolation takes four pixels as an input and computes a weighted average, rather than calculating a simple linear weighted average between two pixels. Because a bicubic interpolation requires four pixels of input, each quartile may receive the last two pixels from the previous quartile as its initial two pixels. Similarly, each quartile may receive 2 pixels from the next quartile to calculate the scaled output pixels at the end of the quartile. This gives the scaler four pixels to work with for computing a bicubic interpolation. If other interpolation algorithms are used, other numbers of previous pixels may be provided from the previous quartile to provide a smooth transition between vertical slices.

Once the scalers have successfully computed a full line of output, that line of output can be re-rasterized, and then driven to the display. To provide a desirable user experience, the scalers may be configured to be able to process approximately 60 frames per second, thus ensuring that the display can be driven at the desired 60 frames per second.

A system and method for providing image scaling will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Figure 1B:
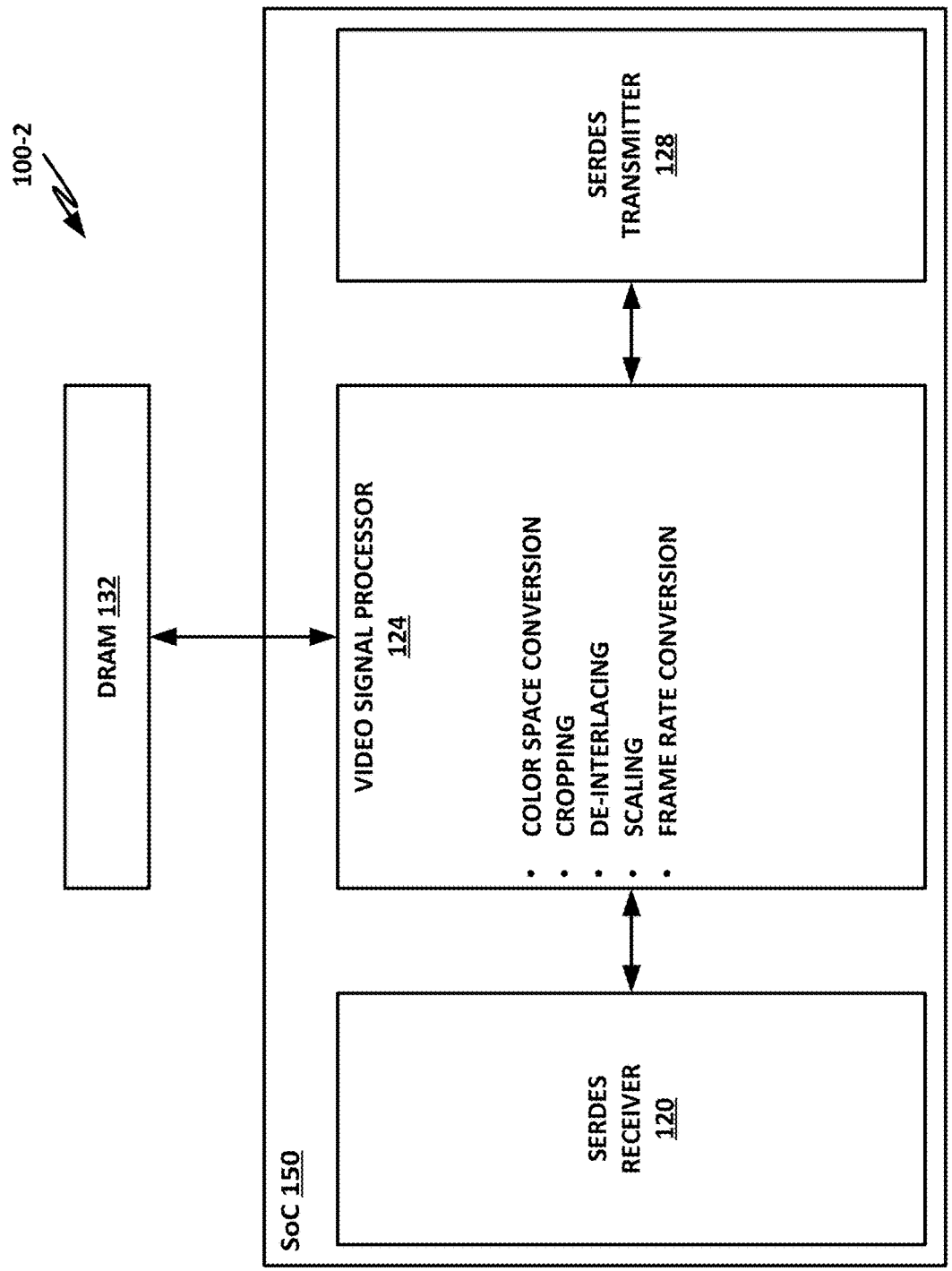

FIGS. 1a and 1b are illustrations of various embodiments of a video system 100, according to the teachings of the present specification.

In the embodiment illustrated in FIG. 1a, an HDMI source 104 is driving a signal. HDMI source 104 may be, for example, a VHS player, DVD player, a Blu-ray disc player, or some digital media content delivery system, such as online video, or video stored in a local storage. In this example, HDMI source 104 drives the output video at some lower resolution such as 480p or HD at 720p or 1080p. HDMI source 104 provides its output video signal to HDMI sink 108.

HDMI sink 108 receives the input video at its native resolution, such as 480p, 720p, 1080p, or some other resolution. However, HDMI sink 108 is configured to communicatively couple to a display such as television 116. Television 116 is capable of a higher resolution than the native resolution of HDMI source 104. For example, television 116 may be capable of a resolution such as 4K or 8K UHD. Thus, to provide a user or viewer of television 116 a premium video experience, a video processor 112 may be disposed between HDMI sink 108 and television 116. Video processor 112 may be capable of driving an ultra HD output at the full resolution capacity of television 116. Specifically, HDMI processor 112 may be configured to receive a lower resolution HDMI signal from HDMI sink 108, upscale that signal to a higher resolution such as 4K or 8K UHD, and drive the upscaled image to television 116. Television 116 then receives the UHD HDMI output from video processor 112, and displays the video on its screen.

Note that video system 100-1 does not necessarily specify the physical relationship between the various elements. In this embodiment, HDMI source 104, HDMI sink 108, HDMI processor 112, and television 116 are shown in block diagram configuration illustrating separate logical functions. It should be noted, however, that these elements can be arranged in any suitable configuration. For example, HDMI source 104, HDMI sink 108, HDMI processor 112, and television 116 could all be one physically packaged unit. Specifically, television 116 could have the ability to receive digital video from an HDMI source 104, forward the video to an HDMI sink 108, process the video in video processor 112, and display the video on a screen of television 116. Alternately, HDMI source 104 could be a completely separate device, such as a video player or a network connection, and HDMI sink 108 could also be provided as a separate HDMI receiver for the system. Video processor 112 could be embodied as a separate logical device, or as a standalone set-top box that provides an HDMI sink 108 for video upscaling functionality.

Video processor 112 could then drive its upscaled output to a UHD-capable display such as television 116. This illustrates only two of many possible embodiments, and in general, any logical grouping or physical configuration and disposition could be used.

FIG. 1b is a block diagram of video system 100-2, in which certain elements are located in a system-on-a-chip (SoC) 150. SoC 150 may be a monolithic article of manufacture based on a silicon or other semiconductor substrate, with logic elements as well as electrical and electronic elements provided therein via a manufacturing process such as silicon wafer fabrication. In this embodiment, video signal processor 124 may be analogous to HDMI processor 112 of FIG. 1a. Serializer/deserializer (SERDES) receiver 120 may be analogous to HDMI sink 108 of FIG. 1a. SERDES transmitter 128 may be considered part of or analogous to video processor 112 of FIG. 1a.

In this embodiment, SoC 150 communicatively couples to a dynamic random access memory (DRAM) 132. DRAM 132 provides operational memory for SoC 150. SERDES receiver 120 may be any suitable species of SERDES, and may receive signals in one or more formats, including, by way of illustrative and nonlimiting example, HDMI, direct media interface (DMI), USB-C, Ethernet (with embedded video in Ethernet packets), or any other suitable video delivery mechanism. SERDES receiver 120 provides its video signal to video signal processor 124.

Video signal processor 124 can provide any number of video signal processing functions on its input video. These can include, by way of illustrative and nonlimiting example, color space (or "gamut") conversion (in which the number of displayed colors can be increased or decreased), image cropping (e.g., from 16×9 to 4×3 or other cropping), deinterlacing of interlaced video, scaling (including upscaling, e.g., from a format such as 480p, 480i, 720p, 1080p, or other up to 4K or 8K UHD), and frame rate conversion (e.g., interpolating and adding or removing frames to convert between formats such as 24 frames per second and 60 frames per second).

Note that the various functions of video signal processor 124 may be performed by various dedicated or cooperative logical blocks. In some cases, these functions may be pipelined such that, for example, an image is cropped or deinterlaced before scaling is performed. In some embodiments, the various elements of video signal processor 124 may be provided by an IP block, which can function as a "black box" with defined inputs, defined outputs, and a defined processing function performed on the inputs to produce the outputs. Such IP blocks advantageously allow system designers to sell those functions as standalone units.

Once video signal processor 124 finishes converting and processing its video, it provides the output video to SERDES transmitter 128, which drives the output to a display such as UHD-capable display 116 of FIG. 1a, a computer monitor, a commercial display (such as a Jumbotron or a large conference room display), or any other display technology.

Figure 2:
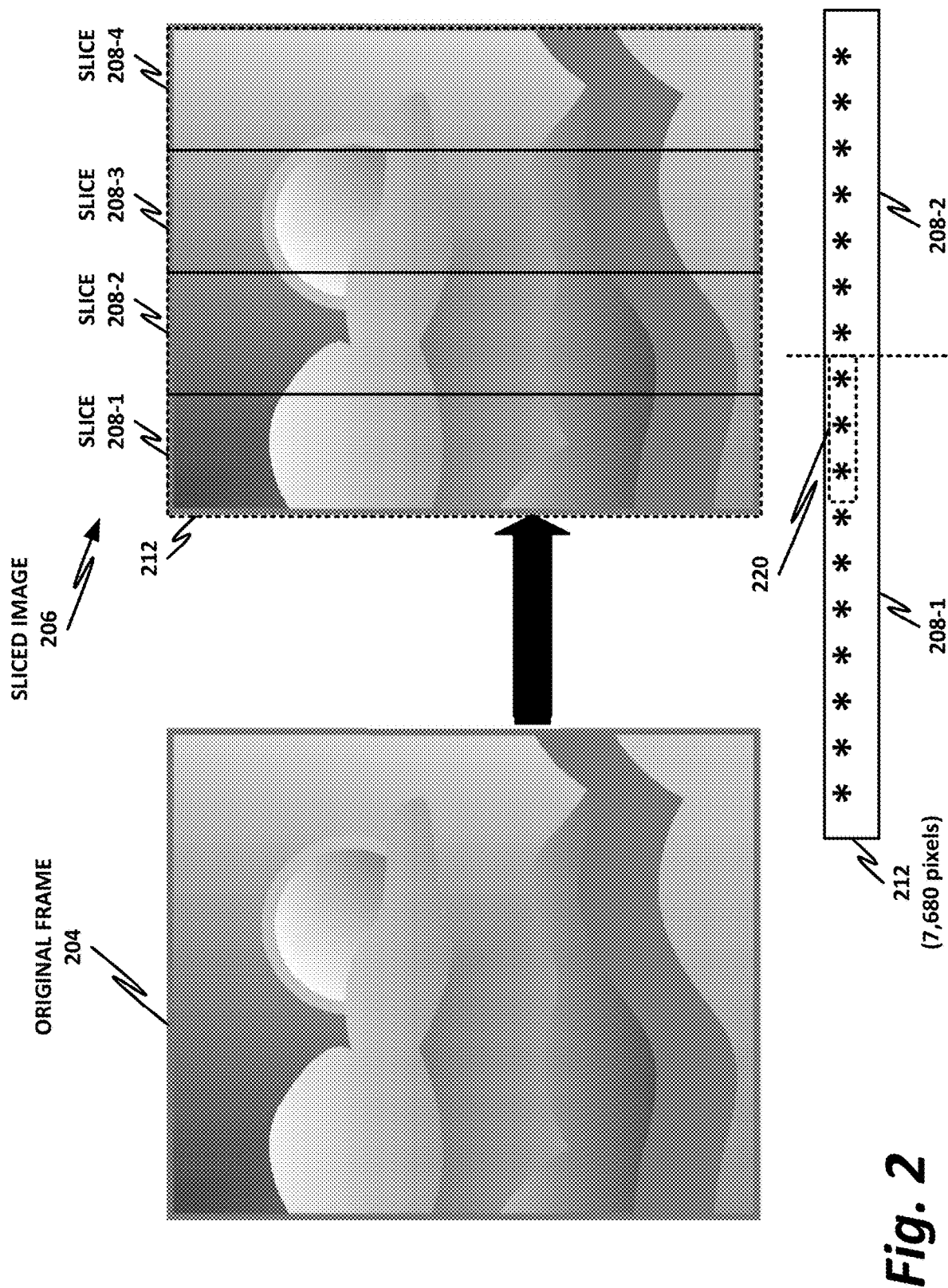
FIG. 2 is an illustration of vertical image slicing, according to the teachings of the present specification.

FIG. 2 is an illustration of vertical image slicing, according to the teachings of the present specification.

Illustrating FIG. 2 is an original frame 204, which may be a frame as extracted from a video stream. For example, original frame 204 may be a single video frame that is displayed on a screen, such as for $\frac{1}{24}$th or $\frac{1}{60}$th of a second. Note that HDMI employs video compression, such as display stream compression (DSC). Because HDMI employs DSC, and because other video formats provide compression, individual frames may not be initially available as monolithic images. Rather, compression technologies often employ a delta between the previous frame and the current frame, and change only those pixels that are different between the frames. But some embodiments of the present specification realize advantages by operating on the video in an uncompressed, frame-by-frame format. Thus, to get original frame 204 from the video stream, a DSC function may be necessary to construct the full frame from the source data. Once frame 204 has been properly constructed, it can then be processed according to the teachings of the present specification.

By way of illustrative example, a scaler may be used to scale original frame 204 up to 8K resolution based on a 7680×4320 pixel bitmap with 48-bit color depth. Note that 8K video at 48-bit color depth is provided here as a nonlimiting example, and other video resolutions may be used. In some embodiments, a method may also be provided to convert from a lower color depth, such as 24-bit color depth, by creating random bits on the LSB side of each color component in a pixel, by a process normally referred to as up-dithering.

Note that dithering and upscaling may be separate processes, or may be performed together. The upscaling may take the form of a linear interpolation, in which a point is interpolated between two other points, with a pixel being interpolated between two other pixels, and with the new pixel being given a color based on a linear weighted average of the colors of the two nearest pixels. Other embodiments may use more complicated algorithms to provide better interpolation and hence better image scaling. For example, a scaler could employ an interpolation algorithm where the resampled pixel is interpolated from a number of neighboring pixels by weighing them with an appropriate impulse response that is determined by the type of kernel used for scaling. For example, with a method of interpolation such as bicubic interpolation, four pixels are used to interpolate a value of the new pixel. The new value is interpolated from two pixels in each dimension, horizontally and vertically (i.e., two pixels to each side of the new pixel, horizontally, as well as two above and two below, vertically). This type of interpolation gives both a better position and a better color for the new pixel.

However, at a given process node (such as 28 nm) existing scalers top out at approximately 650 to 700 MHz, providing 650 to 700 mega-samples per second for interpolating a new image. This may be adequate for interpolating from, for example, 1080p full HD to 4K UHD. But 700 mega-samples per second is insufficient to interpolate when either the input or output rate of the scaler is more than 4K 60 Hz, such as 8K at 60 Hz. Thus, to provide very high resolution such as 8K UHD upscaling, additional processing power may be necessary.

Because it is nontrivial to design a larger and faster scaler IP block, the present specification vertically slices original frame 204 into sliced frame 212. Sliced frame 212 includes a number of vertical slices 208, namely slice 208-1, slice 208-2, slice 208-3, and slice 208-4. Using 8K resolution as an example, sliced image 206 has 4320 lines, with each line being divided into quartiles of a little under 2000 pixels. Each quartile or slice 208 may be assigned to a dedicated scaler in a parallel scaler architecture such that, for example, slice 208-1 is assigned to a first scaler, slice 208-2 is assigned to a second scaler, slice 208-3 is assigned to a third scaler, and slice 208-4 is assigned to a fourth scaler. These scalers may interpolate pixels on a linewise basis, as illustrated by line 212, which includes 7680 pixels. This line is divided into four quartiles or slices, as slice 208-1, slice 208-2, slice 208-3, and slice 208-4. When a first scaler interpolates pixels for slice 208-1, it may with each operation use a method of interpolation to interpolate one new pixel from four input pixels in each dimension (i.e., vertical and horizontal). This output pixel is then output as a new pixel between the two preceding and two following pixels.

The scaler then increments by one pixel, takes a new set of pixels, and interpolates one or more new pixels in the middle of those four pixels.

Note, however, that if slices 208 are treated as completely independent entities, then the output will appear as four related but distinct images, with visible lines between the four slices. Thus, slices 208-2, 208-3, and 208-4 each receive as their first three pixels the last three pixels of the previous slice, which enables the scalers operating on those three slices to interpolate the start boundary pixels between the slices. Similarly, slices 208-1, 208-2, and 208-3 each receive as their last three pixels the first three pixels of the next slice, which enables the scalers operating on those three slices to interpolate the end boundary pixels between the slices. The horizontal offset value may be modulated at the start of every slice except the first slice.

This ensures that when sliced image 206 is scaled up to 8K, the output video will appear as a single seamless image with no lines. Thus, as illustrated in row 212, the final three pixels 220 of slice 208-1 are provided to a second scaler as the first three pixels of slice 208-2. Thus, slice 208-1 and 208-4 have 1923 pixels, while slices 208-2 and 208-3, have 1926 pixels. This use of last and first pixels from the preceding and succeeding slice helps to ensure smooth scaling across vertical slice boundaries.

Figure 3:
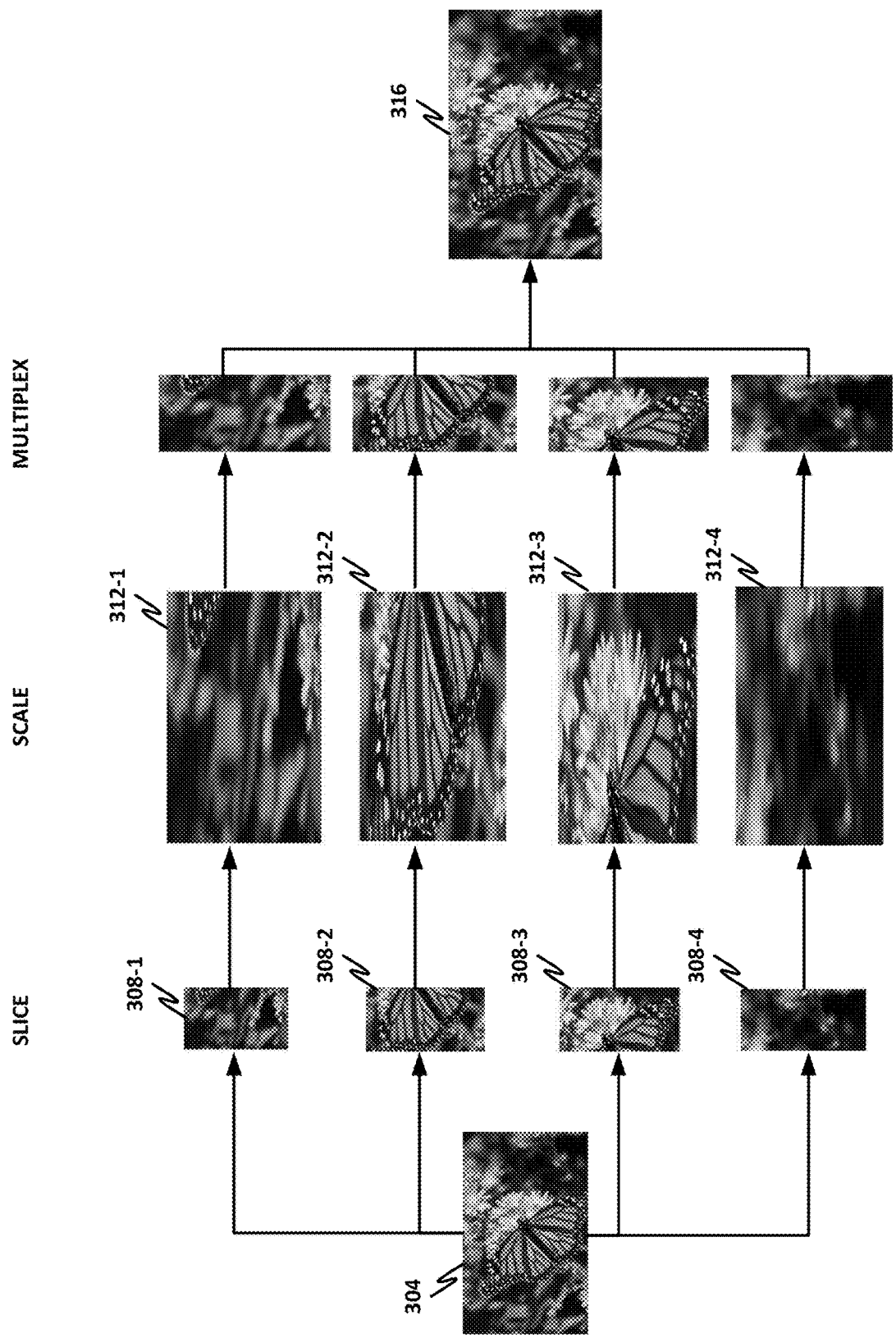
FIG. 3 is a block diagram illustration of how image scaling occurs, according to the teachings of the present specification.

FIG. 3 is a block diagram illustration of how image scaling occurs, according to the teachings of the present specification.

Starting with input image 304, the image is sliced into four vertical slices 308-1, 308-2, 308-3, and 308-4. Each slice 308 represents roughly a quartile of input image 304, although as illustrated in the previous FIGURE, slices 308-2, 308-3, and 308-4 may include one or more pixels from the previous image (e.g., one previous pixel if linear interpolation is being used, or three previous pixels if higher order (e.g., bicubic) interpolation is being used).

Four independent scalers then upscale slices 308 to upscaled slices 312. Namely, slice 308-1 is upscaled to slice 312-1. Slice 308-2 is upscaled to slice 312-2. Slice 308-3 is upscaled to slice 312-3. Slice 308-4 is upscaled to slice 312-4. Throughout this specification, linear and higher order interpolation are used as examples of image scaling techniques that may be utilized. But it should be noted here that many image scaling algorithms are known, and the teachings of the present specification do not necessarily require a particular image scale method. Rather, the teachings herein are compatible with any image scaling algorithm.

Scaled slices 312 are then multiplexed together, by recombining the various slices 312 horizontally and multiplexing the result out to upscaled image 316. For example, original image 304 may be a 1080p full HD image, while upscaled image 316 may be a UHD 4K or 8K image.

Figure 4:
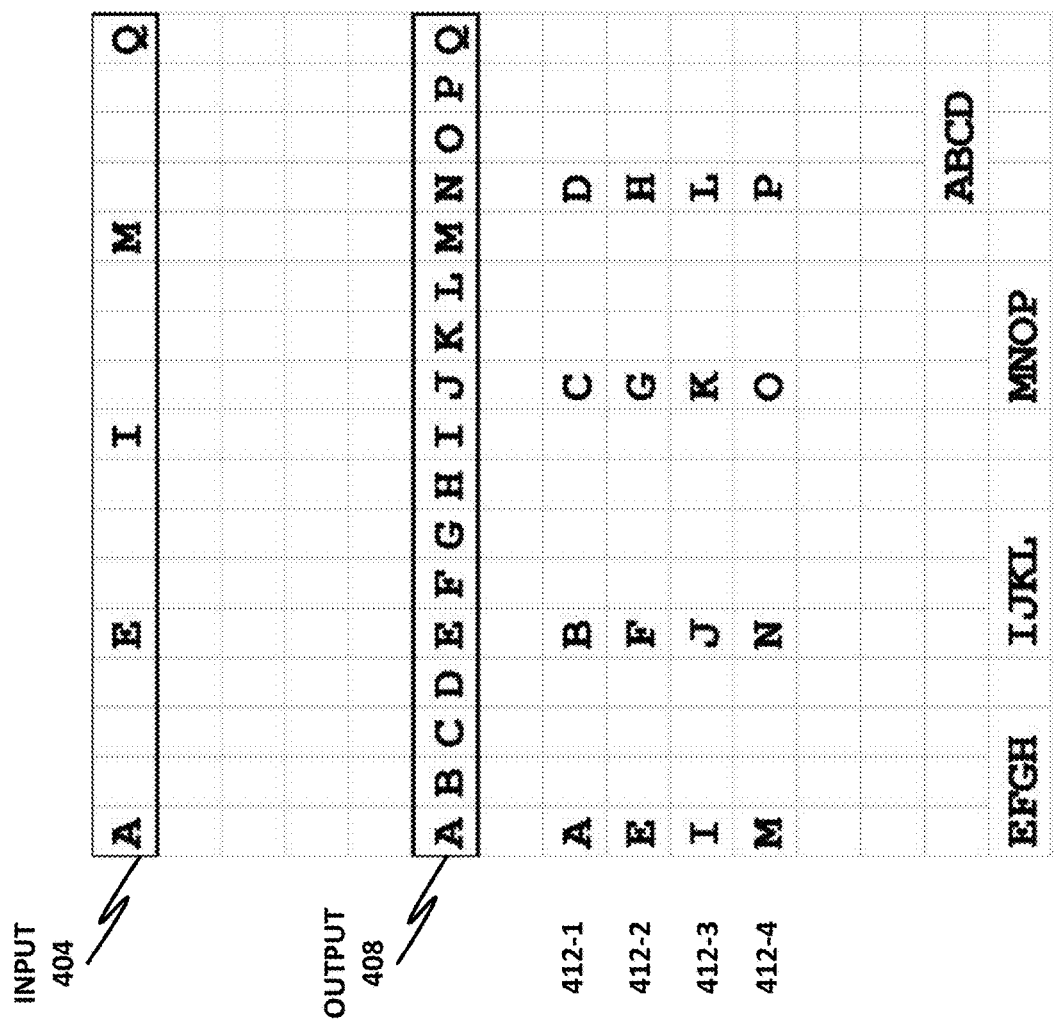
FIG. 4 is a block diagram illustrating a scaling operation, according to the teachings of the present specification.

FIG. 4 is a block diagram illustrating a scaling operation, according to the teachings of the present specification.

In the illustration of FIG. 4, an input 404 is to be scaled up. For ease of reference, pixels within input 404 are referred to as pixels A, E, I, M, and Q. By way of illustration, the pixels may need to be scaled up by a factor of four horizontally. For example, in converting between 1080p and 8K UHD, it is necessary to interpolate three additional horizontal pixels out from each source pixel. It may seem counterintuitive that going from 1080p to 8K is scaling up by 4×, but this is in fact true. In 1080p, the number 1080 refers to the number of vertical lines in a 1920×1080 resolution, while in 8K, the 8K refers to the number of horizontal pixels per line in a 7680×4320 resolution. Thus, 8K is approximately four times larger in each dimension than 1080p, and includes approximately 16 times more total pixels.

Thus, pixel A of input 404 is to be interpolated in output 408 to pixels ABCD. Pixel E of input 404 is to be interpolated in output 408 to pixels EFGH. Pixel I of input 404 is to be interpolated to pixels IJKL in output 408. Pixel M of input 404 is to be interpolated to pixels MNOP in output 408.

As discussed earlier, interpolating out to 8K resolution requires approximately 2.4 megapixels per second of processing power. Because existing scalers are often limited to 700 megapixel per second capability due to implementation limitations such as available MIPS in an embedded system or maximum speed at a particular process node, those scalers may be inadequate to successfully interpolate 1080p out to 8K in real time. Thus, in this example, four independent scalers are used to interpolate the four quartiles of input 404. Specifically, a first scaler interpolates three additional pixels starting from pixel A, a second scaler interpolates three additional pixels starting from pixel E, a third scaler interpolates three additional pixels starting from pixel I, and a fourth scaler interpolates three additional pixels starting from pixel M. As illustrated in the block diagram, the interpolation is performed in real time. Each slice scaler works on a vertical slice, which has a line width that is equal to 1/N of the input line width, and scales the line at a slower time duration that is equal to one line time of actual input. This is unlike multiple scaling operations in parallel, which have computed A, B, C, and D by the time E arrives.

To ensure that output buffers do not go empty, the scalers may operate in a pipelined manner as illustrated. For example, scaler 412-1 first interpolates pixels ABCD, and writes those to an output buffer. While scaler 412-1 is operating on the same quartile of the next line, scaler 412-2 interpolates pixels EFGH and writes those to its output buffer.

While scaler 412-2 is operating on a second quartile of another line, scaler 412-3 interpolates pixels IJKL, and writes those to its output buffer. While scaler 412-3 is working on the third quartile of another line, scaler 412-4 interpolates pixels MNOP and writes those to its output buffer. Once the scalers have written the full interpolated line out to their output buffers, the four quartiles can be multiplexed together, and written out to an output buffer for drawing that line of output on the scaled image.

In cases where linear interpolation is used, each pixel may be interpolated as a simple weighted average of its two nearest points in each dimension (horizontal and vertical) (wherein it is weighted more or less heavily based on which point it is closer to). If a bicubic interpolation is used, then the pixel may be interpolated from two points each above and below, and two points each on the left and right, providing a cubic interpolation in each dimension.

Figure 5:
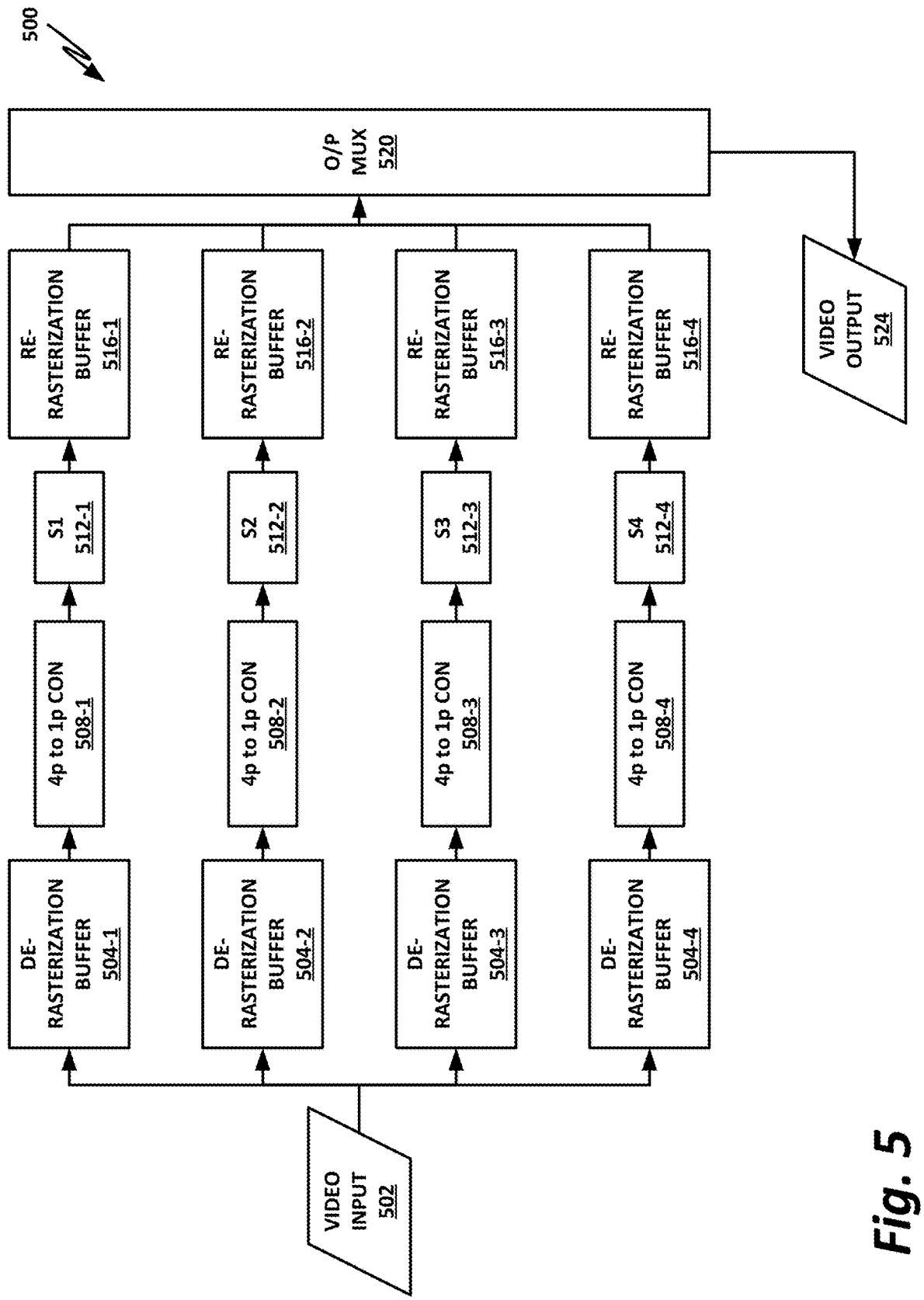
FIG. 5 is a block diagram of an illustrative scaler, according to the teachings of the present specification.

FIG. 5 is a block diagram of an illustrative scaler, according to the teachings of the present specification.

As discussed previously, scaler 500 includes four independent scalers, namely S1 512-1 through S4 512-4. Although these scalers operate independently of one another, parallel scaler 500 is configured to operate these scalers to provide a single scaled output image.

Parallel scaler 500 receives video input 502. Video input 502 is sliced into four vertical slices, as discussed previously. Specifically, a first slice has 1923 pixels (with 3 pixels from the start of second slice), a second slice has 1926 pixels (including the last three pixels from the first slice and the first three pixels from the third slice), a third slice has 1926 pixels (including the last three pixels from the second slice and the first three pixels from the fourth slice), and a fourth slice has 1923 pixels (including the last three pixels from the third slice).

A purpose of de-rasterization buffers 504 is to slow down the input pixels so that the slice scaler can operate at the slower rate, which is its maximum capability. For example, each slice scaler can only produce 1920 scaled pixels in 1 line time from 480 input pixels. But 7680 pixels need to be produced in one line time for 8K output, which requires 1920 input pixels to be processed in one line time. As each slice scaler can only process 480 input pixels in one line time, the 1920 input pixels are slowed down to a rate of 480 input pixels in one line time. The input rate to the de-rasterization buffer is the actual rate of the input (1920 pixels in one line time) and the output of this buffer is at one-quarter speed (e.g., 480 input pixels per one line time).

The first slice is provided to de-rasterization buffer 504-1. The second slice is provided to de-rasterization buffer 504-2. The third slice is provided to de-rasterization buffer 504-3. The fourth slice is provided to de-rasterization buffer 504-4. De-rasterization buffers 504 take the rasterized inputs and produce an output at a rate equal to the line rate of the image.

De-rasterization buffer 504-1 provides its lines to converter 508-1, de-rasterization buffer 504-2 provides its output to converter 508-2, de-rasterization buffer 504-3 provides its output to converter 508-3, and de-rasterization buffer 504-4 provides its output to converter 508-4.

Four pixel to one pixel converters 508-1 collect the four pixels to use to interpolate out to one pixel. Because the system transports and handles four pixels in one clock cycle (e.g., driven by the 600 to 700 MHz clock frequency with a requirement to convert 2400 megapixels per second), it may be necessary to convert four pixels to one pixel, as each slice scaler operates on one pixel, as if it were a single pixel processing scaler. Pixel converters 508 provide their output (e.g., a single pixel each) to the scalers. Specifically, converter 508-1 provides its output to scaler S1 512-1, converter 508-2 provides its output to scaler S2 512-2, converter 508-3 provides its output to scaler S3 512-3, and converter 508-4 provides its output to scaler S4 512-4.

Scalers 512 perform the most compute intensive operation of parallel scaler 500. In the illustrative example, scalers 512 take the four pixels in each dimension provided by the de-rasterization buffers, and interpolate from the input pixels one or more interpolated pixels in the middle of those input pixels. Because scalers 512 can be dedicated hardware (as in an ASIC or SoC), they may be designed to perform the interpolation operation in a single clock cycle. Thus, a scaler 512 operating at 700 MHz provides 700 million samples per second of interpolation. Note that the number of pixels used depends on the scaler kernel that is used. For example, two input pixels are used for bilinear interpolation, four pixels for bicubic interpolation, and other numbers of pixels may be used for other models.

Scalers 512 provide their output to re-rasterization buffers 516. Namely, scaler S1 512-1 provides its output to re-rasterization buffer 516-1, scaler S2 512-2 provides its output to re-rasterization buffer 516-2, scaler S3 512-3 provides its output to re-rasterization buffer 516-3, and scaler S4 512-4 provides its output to re-rasterization buffer 516-4.

Re-rasterization buffers 516 then provide their re-rasterized outputs to an output multiplexer 520, which combines the four vertical slices from the four quartiles of the image into a single output line of the image. Output multiplexer 520 then provides this line as a video output 524.

Figure 6:
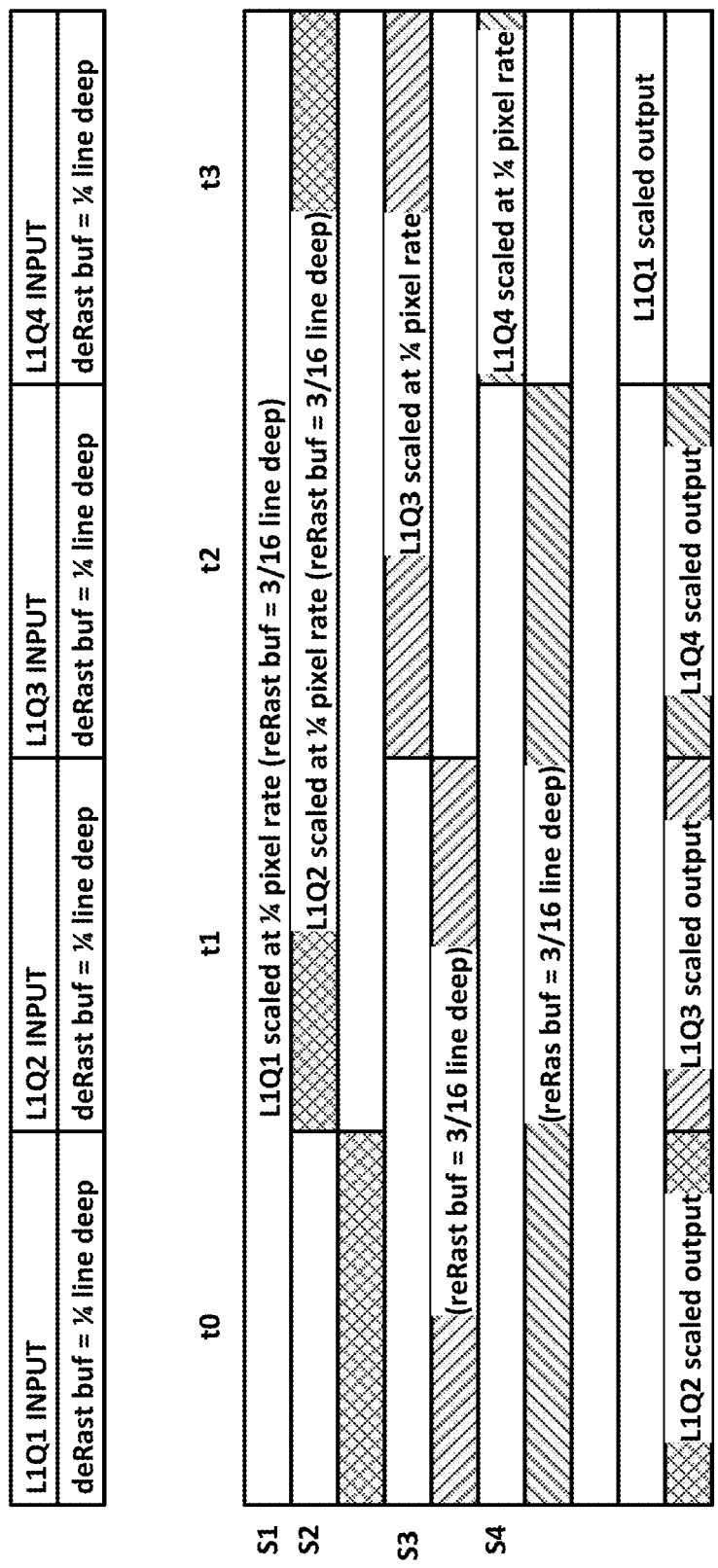
FIG. 6 is a block diagram illustrating pipelining, according to the teachings of the present specification.

FIG. 6 is a block diagram illustrating pipelining, according to the teachings of the present specification. As discussed previously, pipelining may be used to ensure that output buffers remain non-empty, to avoid buffer underruns.

As illustrated in FIG. 6, an input line may be divided into four quartiles. These are referred to as L1Q1 for the first quartile of line 1, L1Q2 for the second quartile of line 1, L1Q3 for the third quartile of line 1, and L1Q4 for the fourth quartile of line 1. Each quartile may be assigned to a specific scaler, such as scalers 512 of FIG. 5. For example, scaler S1 512-1 could be assigned to Q1, scaler S2 512-2 could be assigned to Q2, scaler S3 512-3 could be assigned to Q3, and scaler S4 512-4 could be assigned to Q4. Thus, each scaler consistently operates on the same quartile of its input line. To provide the pipelining, the slice scalers operate on the same line of input, but they operate in a time-distributed way. As shown in FIG. 6, S1 works fully during line 1; S2 works ¾ths of its time on the current line (e.g., for line 1) and ¼th of its time at the start of the next line (e.g., for line 2); S3 works ½ of its time on the current line (e.g., for line 1) and ½ of its time at the start of the next line (e.g., for line 2); S4 works ¼th of its time on the current line (e.g., for line 1) and ¾ths of its time at the start of the next line (e.g., for line 2).

Assuming that the scaler is starting with the first line of the first image in a video stream, at time=t0, L1Q1 is scaled at ¼ pixel rate. This means that the first scaler receives ¼ of the pixels of L1, and operates at approximately one fourth of the desired pixel rate. For example, to upscale to 8K, approximately 2.4 giga samples per second are required, while each scaler may operate at approximately 600 to 700 mega-samples per second. At this point, the re-rasterization buffer for scaler S1 512-1 is $\frac{3}{16}$ line deep.

Scaler S1 begins operating on L1Q1, and operates on L1Q1 between time=t0 and time=t3. At all times scaler S1 512-1 writes its output to L1Q1 scaled output.

At time=t1, scaler S2 512-2 begins operating on L1Q2. As with L1Q1, L1Q2 is scaled at ¼ pixel rate, and the re-rasterization buffer for scaler S2 512-2 is $\frac{3}{16}$ line deep.

At time=t2, scaler S3 512-3 begins scaling L1Q3. As with L1Q1 and L1Q2, L1Q3 is scaled at ¼ pixel rate, and the re-rasterization buffer for scaler S3 512-3 is $\frac{3}{16}$ line deep.

At time=t4, scaler S1 512-1 has finished its work on L1Q1, and provides L1Q1 scaled output to its output buffer. In the meantime, scaler S4 512-4 begins work on L1Q4. As with L1Q1, L1Q2, and L1Q3, L1Q4 is scaled at ¼ pixel rate, and the re-rasterization buffer of scaler S4 512-4 is $\frac{3}{16}$ line deep.

In a next cycle, at time=t0, scaler S1 512-1 begins operating on L2Q1, while the other scalers continue their work on their respective quartiles of L1. At time=t1 of the new cycle, scaler S2 512-2 begins working on L2Q2. At time=t2 of the new cycle, scaler S3 512-3 begins working on L1Q3 of the new cycle, and at time=t3 of the new cycle, scaler S4 512-4 begins working on L2Q4. The outputs can then be multiplexed.

The table below illustrates the state of re-rasterization buffers at various output times. This table illustrates only one example, which may be the same or a different embodiment from those illustrated elsewhere in this specification. For every quartile of a line:

1. ¼ output line is taken out from Q1, Q2, Q3, or Q4 re-rasterization buffer

2. $\frac{1}{16}$ output line is produced by each scaler

3. ¼ input line is the maximum that a particular de-rasterization buffer can take in, depending on availability of the required input and space in that buffer.

| De-rasterization buffers | | | | Re-rasterization buffers | | | | Output | |
|---|---|---|---|---|---|---|---|---|---|
| Q1 | Q2 | Q3 | Q4 | Q1 | Q2 | Q3 | Q4 | Video | |
| ¼ (7.4, 8.1, 8.2, 8.3) | $\frac{1}{16}$ (7.8) | $\frac{1}{16}$ (7.12) | $\frac{1}{16}$ (7.16) | $\frac{3}{16}$ | $\frac{3}{16}$ | $\frac{3}{16}$ | $\frac{3}{16}$ | | This pattern will repeat |
| ¼ − $\frac{1}{16}$ + $\frac{1}{16}$ = ¼ (8.1-8.4) | $\frac{1}{16}$ (7.8) | $\frac{1}{16}$ (7.12) | $\frac{1}{16}$ (7.16) | $\frac{3}{16}$ + $\frac{1}{16}$ − ¼ = 0 | $\frac{3}{16}$ | $\frac{3}{16}$ | $\frac{3}{16}$ | ¼ | |
| ¼ − $\frac{1}{16}$ = $\frac{3}{16}$ (8.2-8.4) | $\frac{1}{16}$ − $\frac{1}{16}$ + ¼ = ¼ (8.5 to 8.8) | $\frac{1}{16}$ (7.12) | $\frac{1}{16}$ (7.16) | 0 + $\frac{1}{16}$ = $\frac{1}{16}$ | $\frac{3}{16}$ + $\frac{1}{16}$ − ¼ = 0 | $\frac{3}{16}$ | $\frac{3}{16}$ | ¼ | |
| $\frac{3}{16}$ − $\frac{1}{16}$ = $\frac{2}{16}$ (8.3, 8.4) | ¼ − $\frac{1}{16}$ = $\frac{3}{16}$ (8.6 to 8.8) | $\frac{1}{16}$ − $\frac{1}{16}$ + ¼ = ¼ (8.9-8.12) | $\frac{1}{16}$ (7.16) | $\frac{1}{16}$ + $\frac{1}{16}$ = $\frac{2}{16}$ | 0 + $\frac{1}{16}$ = $\frac{1}{16}$ | $\frac{3}{16}$ + $\frac{1}{16}$ − ¼ = 0 | $\frac{3}{16}$ | ¼ | |
| $\frac{2}{16}$ − $\frac{1}{16}$ = $\frac{1}{16}$ (8.4) | $\frac{3}{16}$ − $\frac{1}{16}$ = ⅛ (8.7, 8.8) | ¼ − $\frac{1}{16}$ = $\frac{3}{16}$ (8.10 to 8.12) | $\frac{1}{16}$ + ¼ (8.13-8.16) | $\frac{2}{16}$ + $\frac{1}{16}$ = $\frac{3}{16}$ | $\frac{1}{16}$ + $\frac{1}{16}$ = $\frac{2}{16}$ | 0 + $\frac{1}{16}$ = $\frac{1}{16}$ | $\frac{3}{16}$ + $\frac{1}{16}$ − ¼ = 0 | ¼ | |
| $\frac{1}{16}$ − $\frac{1}{16}$ + ¼ = ¼ (9.1 to 9.4) | $\frac{2}{16}$ − $\frac{1}{16}$ = $\frac{1}{16}$ (8.8) | $\frac{3}{16}$ − $\frac{1}{16}$ = $\frac{2}{16}$ (8.11, 8.12) | ¼ − $\frac{1}{16}$ = $\frac{3}{16}$ (8.14 to 8.16) | $\frac{3}{16}$ + $\frac{1}{16}$ − ¼ = 0 | $\frac{2}{16}$ + $\frac{1}{16}$ = $\frac{3}{16}$ | $\frac{1}{16}$ + $\frac{1}{16}$ = $\frac{2}{16}$ | 0 + $\frac{1}{16}$ = $\frac{1}{16}$ | ¼ | |

By providing this parallel and pipelined scaling, the system of the present specification realizes a 12-bit process with 4:4:4 color encoding data. 4:4:4 is a color format in which the luma and chroma components are retained at full bandwidth. The color may be rendered in a color space such as YUV (Y=luma, UV=chrominance). In other embodiments, other color spaces such as red, green, blue (RGB) or cyan, magenta, yellow, black (CMYK) may be used.

Advantageously, this method can be used with directional interpolation that provides sharpness, detail, and picture enhancement, and also provides support for user-controllable horizontal and vertical resolutions, as well as aspect ratio conversion.

Figure 7:
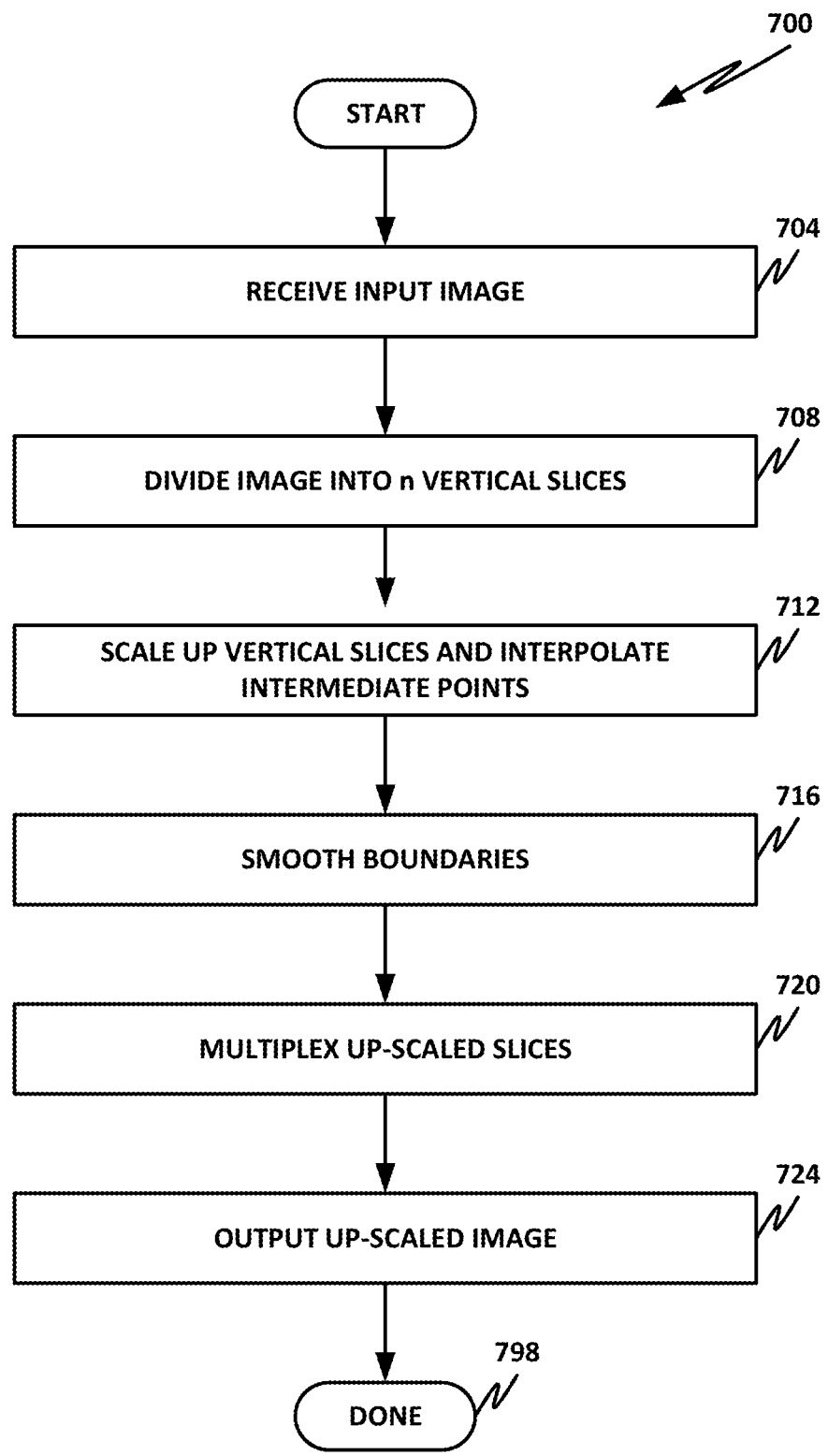
FIG. 7 is a flowchart of a method of upscaling video, according to the teachings of the present specification.

FIG. 7 is a flowchart of a method 700 of upscaling video, according to the teachings of the present specification.

Method 700 may be performed by any suitable hardware or combination of hardware, software, and/or firmware. For ease of reference, the device performing method 700 will be referred to as a scaler. This should be understood to encompass any hardware, software, and/or firmware that provides the method.

In block 704, the scaler receives the original input image. The original input image may be, for example, a video in any suitable format such as 480p, 720p, 1080p, or 4K UHD, by way of illustrative and nonlimiting example. Note that these formats are provided by way of example only, and other resolutions may be supported according to the needs of a particular embodiment.

In block 708, the scaler divides the input image into N vertical slices. In the foregoing examples, illustrations show the image being divided into four vertical slices, each one being referred to as a quartile. This is useful, for example, in the case of upscaling video to 8K with a 700 MHz scaler. But other embodiments may require other numbers of slices, or other types of hardware operating at other clock speeds.

In block 712, the scaler operates in parallel a plurality of individual per-slice scalers to scale up the vertical slices and interpolate intermediate points between pixels for each image. This interpolation may take the form, for example, of linear interpolation between two points in each dimension, higher order (e.g., bicubic) interpolation between four points in each dimension, other polynomial interpolation, or any other suitable upscaling or downscaling algorithm that is compatible with the teachings of the present specification.

In block 716, upscaling the vertical slices includes smoothing boundaries between the slices. The scaler may perform this, for example, by providing one, three, or some other number of pixels from the previous slice to the next slice. This allows a smooth interpolation between the slices. In other embodiments, particularly those that use a different algorithm other than linear interpolation or higher order interpolation, other suitable algorithms may be used to smooth the boundaries.

The result is N individual upscaled slices.

In block 720, the scaler multiplexes the scaled slices together. This enables the outputting of the scaled slices as a single image. For example, the multiplexer may include a number of input lines, with each individual scaler providing a quartile or other 1/N input line. The multiplexer concatenates these quartiles or 1/N-tiles together, thus creating a single cohesive line of output.

In block 724, once all of the lines of an output image are gathered, that output image may be driven to the screen for 1/k second, where k is the frame rate (e.g., 24 frames per second or 60 frames per second, by way of illustration).

In block 798, the method is done.

Figure 8:
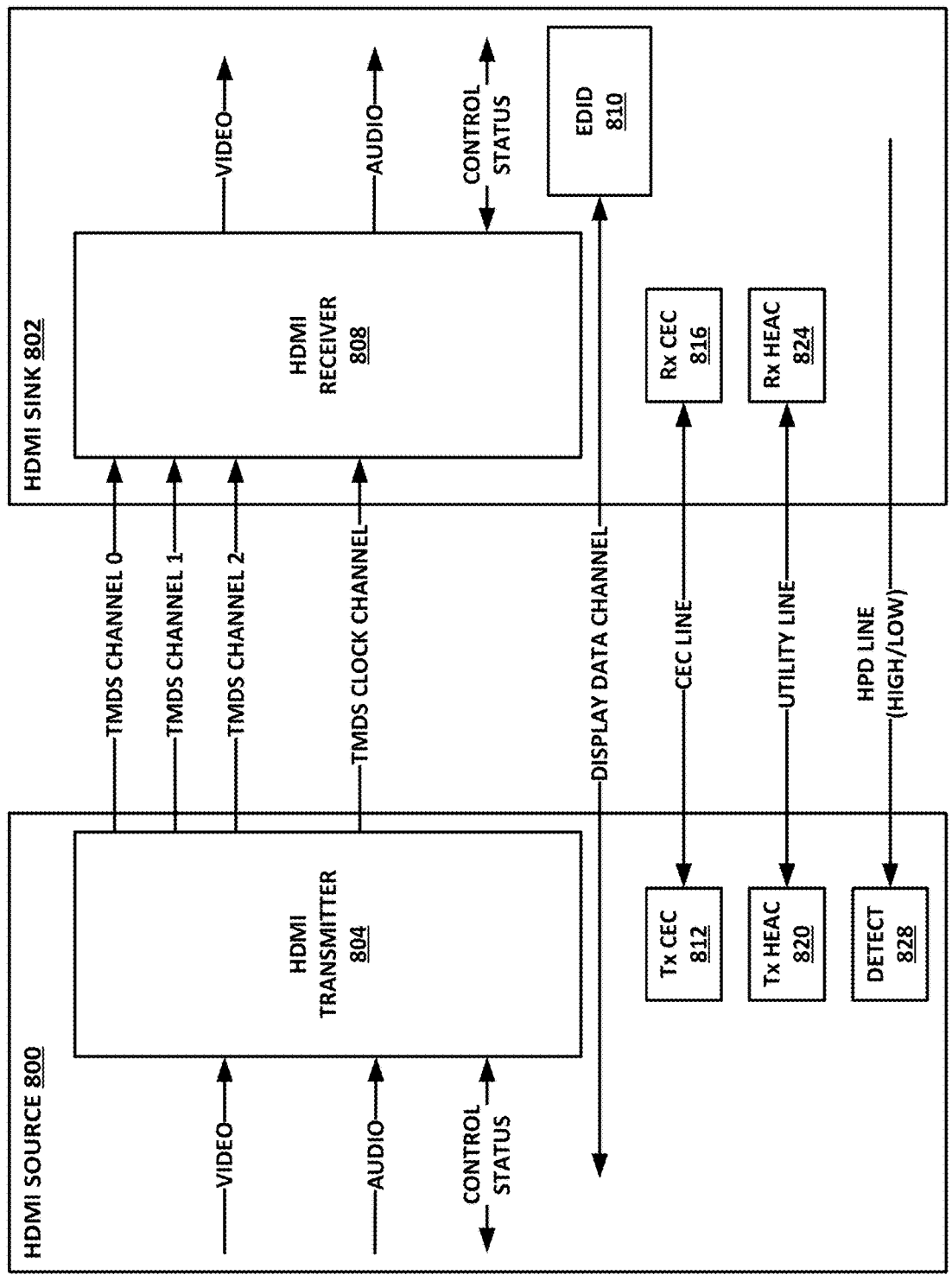
FIG. 8 is a block diagram of an HDMI system, according to the teachings of the present specification.

FIG. 8 is a block diagram of an HDMI system, according to the teachings of the present specification. In this example, the HDMI system includes HDMI source 800 and HDMI sink 802.

HDMI source 800 may be provided, by way of illustrative example, by a DVD player, Blu-ray disc player, computer, or other video source. HDMI source 800 receives video and audio signals which are to be transmitted by HDMI transmitter 804. HDMI transmitter 804 includes three physically separate communication channels, namely the data display channel (DDC), the transition-minimized differential signaling (TMDS) signal, and the consumer electronics control (CEC) channel. HDMI source 800 may also provide an HDMI Ethernet and audio return channel (HEAC), which is an optional channel for Ethernet and audio return. Furthermore, HDMI source 800 may provide an optional hot plug detect channel (HPD) line, which is either high or low, and which provides detection of a connection.

The various channels and functions of an HDMI source 800 and HDMI sink 802 are provided by the HDMI standard, which has various embodiments and iterations. The illustration of this FIGURE should be understood to be merely an illustrative example of an Ethernet controller pair, and should not be understood as a limiting example, or to limit the teachings of the present specification to a specific version of the HDMI standard. In general, the teachings of this FIGURE should be understood as an illustrative framework in which the teachings of the present specification can be practiced. Specifically, in embodiments where HDMI is used as a transmission standard for audio and video data, an embodiments of the teachings of the present specification may include elements such as those shown in HDMI source 800 and HDMI sink 802.

The TMDS channel between HDMI transmitter 804 and HDMI receiver 808 interweaves video, audio, and auxiliary data using three different packet types. These are known as the video data period, the data island period, and the control period.

During the video data period, the pixels of the output video are transmitted between HDMI transmitter 804 and HDMI receiver 808. The data island period, which can occupy horizontal or vertical blinking intervals, is used to transmit audio and auxiliary data between HDMI transmitter 804 and HDMI receiver 808. These audio and auxiliary data may be transmitted as a series of packets, similar to a data transmission over a more traditional communication medium such as Ethernet or universal serial bus (USB).

The control period occurs between the video and data island periods, and is used to transmit control signals. HDMI uses the TMDS channels to transmit characters encoded using 8b/10b encoding. Note that HDMI is backward-compatible with the older digital visual interface (DVI) standard, as DVI also used TMDS to transit video data. But HDMI uses a smaller connector, and also adds the ability to provide the data island period and control period between horizontal and vertical blinking intervals of the video data period.

The display data channel provides communications based on the inter-integrated circuit (I2C) bus specification. The HDMI standard requires its devices to implement the DDC, or enhanced data display channel (EDDC), which is used by HDMI source 800 to read extended display identification data (EDID) or enhanced EDID from HDMI sink 802. EDID 810 informs HDMI source 800 of which audio and/or video formats HDMI sink 802 can accept. The HDMI standard requires the DDC to support a minimum of 100 kb per second bandwidth, and may be scaled up to even faster speeds. In some embodiments, the DDC is also used to provide high-bandwidth digital content protection (HDCP), which is used to enforce digital rights management (DRM) on content transmitted between the HDMI source 800 and HDMI sink 802. This helps to ensure that a consumer cannot extract high quality digital video from the video stream using an intermediary device.

In the illustration of FIG. 8, Tx CEC 812 and Rx CEC 816 communicate via CEC line. The CEC line enables an end user to command and control CEC-enabled devices. Current iterations of the HDMI standard allow up to 15 different CEC-enabled devices to be controlled via the HDMI connection. Thus, a user may control a television, DVD player, Blu-ray disc player, or other devices using only a single remote control such as a television remote, a set-top box remote, a DVD player remote, or other remote that controls a single device. Advantageously, CEC allows individual CEC-enabled devices to command and control each other without user intervention.

CEC provides a single-wire bidirectional serial bus based on European Committee for Electrotechnical Standardization (CENELEC) standard AV.link protocol.

Where it is provided, an HEAC utility line may provide communication between a transmitter HEAC 820 and a receiver HEAC 824. The HDMI Ethernet and audio return channel provides both the audio return channel (ARC) and the HDMI Ethernet channel (HEC). The joint HEAC was introduced in HDMI standard 1.4, and provides a high-speed directional data communication for HEC, and the ability to send audio data upstream via ARC.

ARC is an audio link that replicates other cables between the TV and receiver or speaker system. This may be used when the TV generates or receives a video stream instead of other equipment. For example, this may be used when video is being provided by way of an app on a smart TV (such as via streaming provider Netflix), but the audio is provided by some other equipment, such as external speakers. Absent ARC, audio output from the television would have to be routed via a separate cable into the speaker system. But with ARC, the audio can be provided directly to the speaker by the television. The HEC consolidates video, audio, and data streams into a single HDMI cable, and enables IP-based applications over HDMI. This provides a bidirectional Ethernet communication at 100 Mb per second or more. Physically, the HEC is a hybrid that simultaneously sends and receives 100Base-T signals via a single twisted pair of data-grade wire.

Figure 9A:
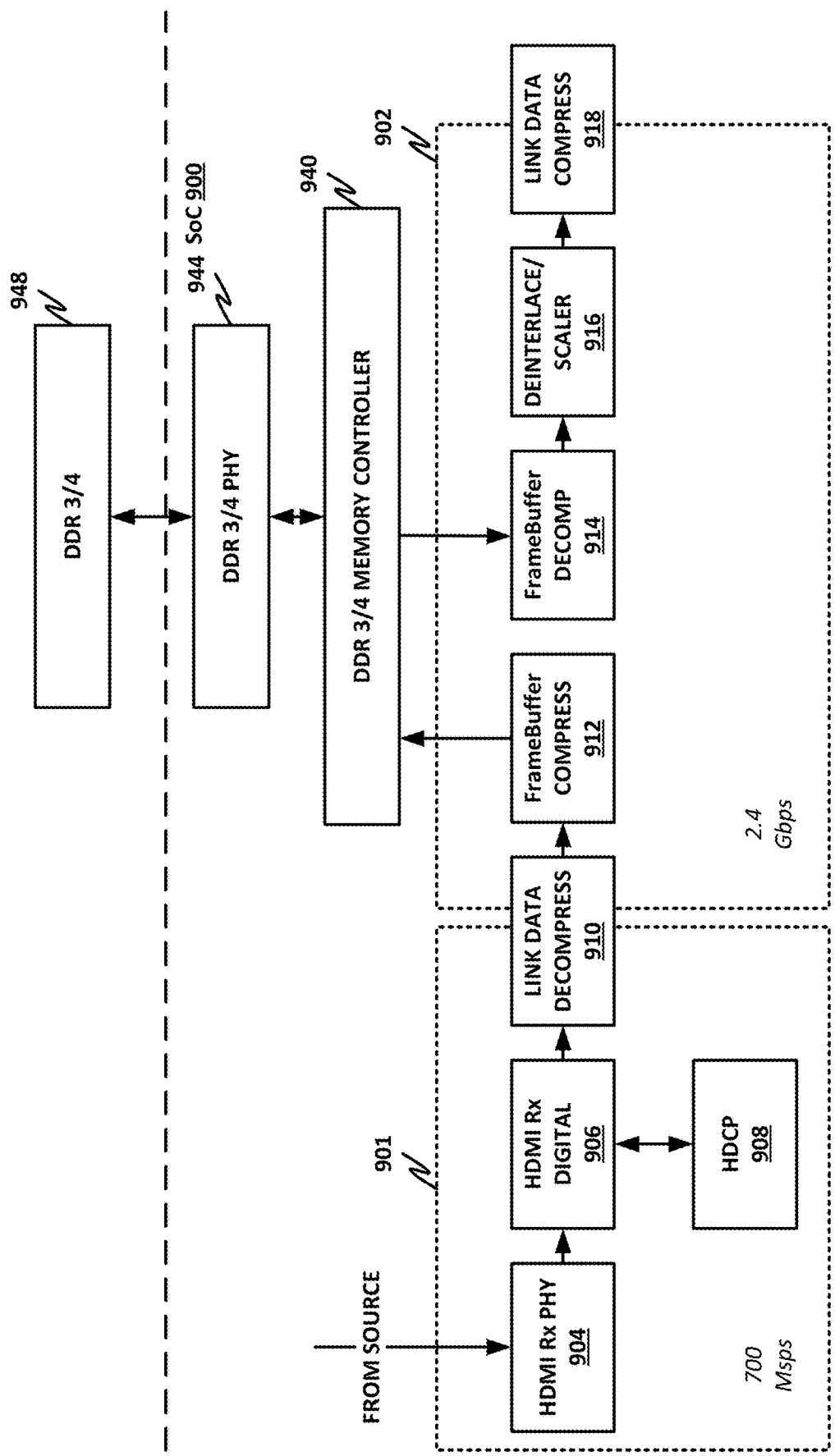
FIGS. 9a and 9b are a block diagram of a system-on-a-chip, according to the teachings of the present specification.
Figure 9B:
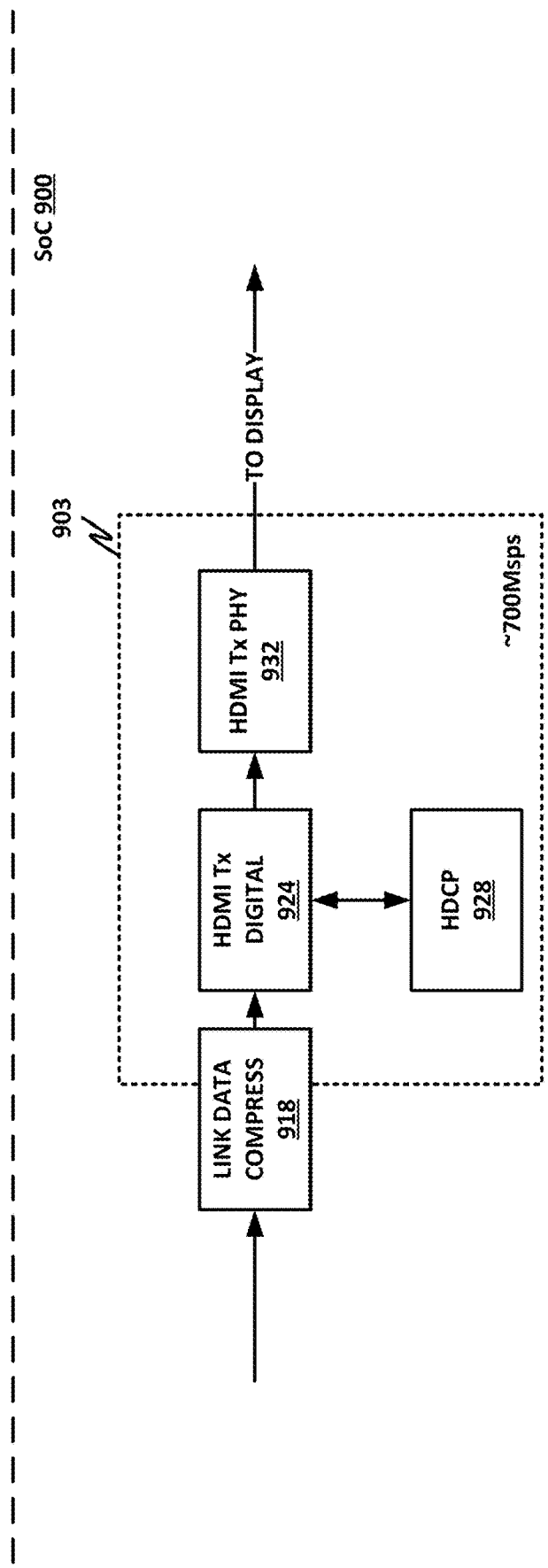

FIGS. 9a and 9b are a block diagram of a system-on-a-chip 900, according to the teachings of the present specification.

Note that SoC 900 is provided as an illustrative and nonlimiting example of a form factor that can be used in the teachings of the present specification. In this case, SoC 900 monolithically provides a number of video processing functions on an HDMI receiver, and provides the processed video as an HDMI output. Such an SoC was illustrated as SoC 150 in FIG. 1b. The teachings of SoC 150 of FIG. 1b may apply to SoC 900 of FIGS. 9a and 9b where they are compatible. However, it should be understood that SoC 900 may in some examples be a separate or alternative embodiment to SoC 150 of FIG. 1b. In other examples, SoC 900 may be considered a more detailed illustration of the teachings of SoC 150 of FIG. 1b.

In FIG. 9a, it is shown that SoC 900 can operate with a random access memory such as DDR ¾ 948. This is a double data rate dynamic random access memory (DRAM), which in some embodiments is not part of SoC 900, but rather is provided as a separate module. This illustration should not be understood, however, to preclude the use of an on-chip DDR with SoC 900. Rather, this illustrates merely a common embodiment, in which DDR 948 is provided as a separate modular element from SoC 900.

Excluding DDR 948, the other elements illustrated in FIGS. 9a and 9b are commonly included in an SoC such as SoC 900. This should not be understood, however, to imply that an SoC 900 needs to include all the elements illustrated here, or that it cannot include other elements than those illustrated. Rather, SoC 900 is provided as an illustration of a commonly used configuration.

For convenience, SoC 900 is divided into three blocks, namely blocks 901 and 902 of FIG. 9a, and block 903 of FIG. 9b. Blocks 901 and 903 may operate at approximately 700 MHz or 700 mega-samples per second. In contrast, block 902 includes real-time video operations that may need to be performed at a much faster speed, such as 2.4 giga samples per second. This higher speed may be required, for example, to provide real-time processing and upscaling of 8K video.

In block 901, an HDMI receiver PHY 904 provides a physical interface for receiving video data from a video source. The video source may be any of the sources discussed in this specification, or any other video source that is suitable to the teachings of this specification. For example, in addition to HDMI, DisplayPort, or an analog video interface such as CVBS (composite video baseband signal, also known as color, video, blanking, and sync).

The input video received by HDMI receiver PHY 904 is processed by an HDMI receiver digital circuit 906. HDMI receiver digital circuit 906 includes the logic for processing an HDMI input, according to the HDMI standard. Note that HDMI receiver digital circuit 906 may also include an HDCP capability 908. HDCP 908 provides, as illustrated in FIG. 8, DRM for HDMI content.

HDMI receiver digital circuit 906 provides its output to a link data decompressed circuit 910. Link data decompressed circuit 910 may be required to convert the compressed HDMI video signal into a series of individual frames, with each frame being its own bitmap. This may be necessary because HDMI, according to industry standards, provides a compressed video format in which video frames are not provided as a series of bitmaps, but rather as a series of deltas from a reference frame.

The decompressed video may be provided to FrameBuffer compressor 912, which provides FrameBuffer compression, and stores the result in memory via DDR ¾ memory controller 940. Memory controller 940 communicates with DDR ¾ PHY 944, which provides communication with DDR 948. As noted above, DDR 948 need not necessarily be part of SoC 900, but in some examples may instead be provided as a separate modular unit. DDR ¾ PHY 994 may include compression codecs.

FrameBuffer decompressor 914 receives the compressed information from memory, and then provides the decompressed video to a deinterlacer/scaler 916. Deinterlacer/scaler 916 may provide several functions. For example, if video is provided in an interlaced format instead of a progressive scan format, it may need to first be converted to progressive scan format before it can be upscaled. Thus, the deinterlacer function of deinterlacer/scaler 916 can provide this deinterlacing. Deinterlacer/scaler 916 may also provide a parallel scaler such as scaler 500 of FIG. 5. This can upscale or downscale images, according to the teachings of the present specification.

Once deinterlacer/scaler 916 has processed, deinterlaced, and upscaled or downscaled the image, the video frames may be provided to link data compressor 918. link data compressor 918 compresses the video according to the HDMI standard, so that it is no longer a series of individual bitmaps of individual frames, but rather provides a compressed video format based on differences between frames.

Turning to FIG. 9b, DSC compressor 920 provides its compressed HDMI-compatible signal to HDMI transmitter digital circuit 924. As with HDMI receiver digital circuit

906, HDMI transmitter digital circuit 924 includes the logic for providing the HDMI signal, and may include HDCP 928 for DRM.

HDMI transmitter digital circuit 924 provides its data to HDMI transmitter PHY 932, which drives the HDMI signal out to a display such as, for example, UHD-capable television 116 of FIG. 1.

EXAMPLE IMPLEMENTATIONS

The following examples are provided by way of illustration.

There is disclosed in one example a video processor, comprising: an input buffer to receive an input image; a slicer circuit to divide the input image into a plurality of N vertical slices; N parallel image scalers, wherein each scaler is hardware configured to linewise scale one of the N vertical slices according to an image scaling algorithm; and an output multiplexer to combine the scaled vertical slices into a combined scaled output image.

There is further disclosed a video processor, further comprising logic and circuitry to receive an input video stream, and to extract the input image from the input video stream.

There is further disclosed a video processor, wherein each vertical slice is substantially a 1/N-tile of the input image.

There is further disclosed a video processor, wherein N=4.

There is further disclosed a video processor, wherein the input image is a frame of a video stream, and wherein the output image is scaled to 7,680 horizontal pixels×4,320 vertical pixels.

There is further disclosed a video processor, comprising logic and circuitry to receive an input video stream at 8K UHD resolution, and to downscale the image to a lower resolution via the N parallel image scalers.

There is further disclosed a video processor, comprising logic and circuitry to receive an input video stream at a resolution selected from 480p, 480i, 720p, 720i, 1080p, 1080i, and 4K Ultra-High Definition (UHD), and to scale the input video stream to an output video stream at 8K UHD resolution via the N parallel image scalers.

There is further disclosed a video processor, wherein the image scaling algorithm includes a bilinear interpolation.

There is further disclosed a video processor, wherein the image scaling algorithm includes a higher order interpolation.

There is further disclosed a video processor, wherein the image scaling algorithm includes a higher order interpolation.

There is further disclosed a video processor, wherein vertical slices representing substantially a first, second, and third quartile include three first pixels from a succeeding slice, and vertical slices representing second, third, and fourth quartiles include three last pixels from a preceding slice; also, the first, second, and third slices include the three first pixels from the succeeding slice.

There is further disclosed a video processor, wherein at least some of the vertical slices include one or more last pixels from a preceding or succeeding slice.

There is further disclosed a video processor, wherein at least some of the vertical slices include three last pixels from a preceding or succeeding slice.

There is further disclosed a video processor, wherein the N image scalers are pipelined to prevent buffer underruns.

There is further disclosed a video processor, wherein the output image is a frame of a high-definition multimedia interface (HDMI)-compatible video stream.

There is further disclosed a video processor, wherein the input image is a frame of a high-definition multimedia interface (HDMI)-compatible video stream.

There is further disclosed an intellectual property (IP) block, comprising the video processor of any of the preceding examples.

There is also disclosed a system-on-a-chip (SoC), comprising: circuitry to receive an input image; an image slicer to divide the input image into a plurality of N slices; N image scalers disposed to scale the N slices in parallel, and including an interpolator circuit to interpolate intermediate pixels between pixels in the input image; and an output multiplexer to multiplex the scaled vertical slices into a combined scaled output image.

There is further disclosed an SoC, further comprising N input de-rasterization buffers to receive the input image at 1/Nth of pixel rate; and a re-rasterization buffer to collect the N scaled slices and output them at a pixel rate of 1.

There is further disclosed an SoC, further comprising circuitry to receive an input video stream, and to extract the input image from the input video stream.

There is further disclosed an SoC, wherein each vertical slice is substantially a 1/N-tile of the input image.

There is further disclosed an SoC, wherein N=4.

There is further disclosed an SoC, wherein the input image is a frame of a video stream, and wherein the output image is scaled to 7,680 horizontal pixels×4,320 vertical pixels.

There is further disclosed an SoC, comprising circuitry to receive an input video stream at a resolution selected from 480p, 480i, 720p, 720i, 1080p, 1080i, and 4K Ultra-High Definition (UHD), and to scale the input video stream to an output video stream at 8K UHD resolution via the N parallel image scalers.

There is further disclosed an SoC, wherein the interpolator circuit includes a linear interpolator.

There is further disclosed an SoC, wherein the interpolator circuit includes a polynomial interpolator.

There is further disclosed an SoC, wherein the interpolator circuit includes a higher order interpolator, and wherein at least some of the vertical slices include three last pixels from a preceding slice.

There is further disclosed an SoC, wherein the interpolator circuit includes a higher order interpolator, and wherein at least some of the vertical slices include three last pixels from a succeeding slice.

There is further disclosed an SoC, wherein at least some of the vertical slices include one or more last pixels from a preceding slice.

There is further disclosed an SoC, wherein at least some of the vertical slices include one or more last pixels from a succeeding slice.

There is further disclosed an SoC, wherein at least some of the vertical slices include three last pixels from a preceding slice.

There is further disclosed an SoC, wherein at least some of the vertical slices include three last pixels from a succeeding slice.

There is further disclosed an SoC, wherein the N image scalers are pipelined to prevent buffer underruns.

There is further disclosed the SoC of a number of the above examples, further comprising: a high-definition multimedia interface (HDMI) receiver to receive an input HDMI video stream; a DSC decompressor to decompress the HDMI video input and to extract the input image; a DSC compressor to receive the output image and to encode the output image into a scaled output HDMI video stream; and an HDMI transmitter to transmit the scaled output HDMI video stream.

There is further disclosed an SoC, further comprising a codec for frame buffer compression.

There is further disclosed an SoC, further comprising a dynamic random access memory interface.

There is further disclosed an SoC, further comprising a deinterlacer.

There is further disclosed an SoC, further comprising a color space converter.

There is further disclosed an SoC, further comprising an image cropper.

There is further disclosed an SoC, further comprising a frame rate converter.

There is also disclosed a method of scaling an image, comprising: receiving an input image; slicing the input image into a plurality of N slices; raster-based scaling, in parallel, the N slices according to an image scaling algorithm; and combining the scaled vertical slices into a combined scaled output image.

There is further disclosed a method, further comprising receiving extracting the input image from an input video stream.

There is further disclosed a method, wherein each slice is substantially a 1/N-tile of the input image There is further disclosed a method, wherein N=4.

There is further disclosed a method, wherein the input image is a frame of a video stream, and wherein the output image is scaled to 7,680 horizontal pixels×4,320 vertical pixels.

There is further disclosed a method, further comprising upscaling an image to 8K UHD resolution or downscaling the image from 8K UHD resolution.

There is further disclosed a method, wherein the image scaling algorithm includes a linear interpolation.

There is further disclosed a method, wherein the image scaling algorithm includes a polynomial interpolation.

There is further disclosed a method, wherein the image scaling algorithm includes a quadratic interpolation.

There is further disclosed a method, wherein at least some of the vertical slices include one or more last pixels from a preceding slice.

There is further disclosed a method, wherein at least some of the vertical slices include three last pixels from a preceding slice There is further disclosed a method, further comprising pipelining the parallel linewise image scaling.

There is further disclosed a method, wherein the output image is a frame of a high-definition multimedia interface (HDMI)-compatible video stream.

There is further disclosed a method, wherein the input image is a frame of a high-definition multimedia interface (HDMI)-compatible video stream.

There is further disclosed the method of a number of the above examples, further comprising providing frame buffer compression and decompression.

There is further disclosed an SoC, further comprising a dynamic random access memory interface.

There is further disclosed the method of a number of the above examples, further comprising providing deinterlacing.

There is further disclosed the method of a number of the above examples, further comprising providing color space conversion.

There is further disclosed the method of a number of the above examples, further comprising providing image cropping.

There is further disclosed an apparatus, comprising means to perform the method of a number of the above examples.

There is further disclosed an apparatus, wherein the means comprise a system-on-a-chip.

There is further disclosed an apparatus, wherein the means comprise a set-top-box.

There is further disclosed a smart television, comprising an apparatus of one or more of the above examples.

There are also disclosed one or more tangible, non-transitory computer-readable mediums having stored thereon instructions to instruct a programmable device to perform the method or realize at least part of the apparatus of a number of the above examples.

There are also disclosed one or more tangible, non-transitory computer-readable mediums, wherein the instructions include hardware description language directives.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present specification.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

Note that the activities discussed above with reference to the FIGURES are applicable to any integrated circuit that involves signal processing (for example, gesture signal processing, video signal processing, audio signal processing, analog-to-digital conversion, digital-to-analog conversion), particularly those that can execute specialized software programs or algorithms, some of which may be associated with processing digitized real-time data. Certain embodiments can relate to multi-DSP, multi-ASIC, or multi-SoC signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include, for example, pulmonary monitors, accelerometers, heart rate monitors, or pacemakers, along with peripherals therefor. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion, rendering, and display products in battery monitoring, control systems, reporting controls, maintenance activities, and others. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily part of smartphones, tablets, security systems, PCs, gaming technologies, virtual reality, simulation training, etc.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SoC) central processing unit (CPU) package. An SoC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. Any module, function, or block element of an ASIC or SoC can be provided, where appropriate, in a reusable "black box" intellectual property (IP) block, which can be distributed separately without disclosing the logical details of the IP block. In various other embodiments, the digital signal processing functionalities may be implemented in one or more silicon cores in application-specific integrated circuits (ASICs), field-programmable gate arrays (FPGAs), and other semiconductor chips.

In some cases, the teachings of the present specification may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, converters, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke 35 U.S.C. § 112(f) as it exists on the date of the filing hereof unless the words "means for" or "steps for" are specifically used in the particular claims; and (b) does not intend, by any statement in the specification, to limit this disclosure in any way that is not otherwise reflected in the appended claims.

What is claimed is:

1. A video processor, comprising:
   an input buffer to receive an input image;
   a slicer circuit to divide the input image into a plurality of N vertical slices;
   N parallel image scalers, wherein each scaler is hardware configured to linewise scale one of the N vertical slices according to an image scaling algorithm; and
   an output multiplexer to combine the scaled vertical slices into a combined scaled output image.

2. The video processor of claim 1, further comprising logic and circuitry to receive an input video stream, and to extract the input image from the input video stream.

3. The video processor of claim 1, wherein each vertical slice is substantially a quartile of the input image.

4. The video processor of claim 1, comprising logic and circuitry to receive an input video stream at a resolution selected from 480p, 480i, 720p, 720i, 1080p, 1080i, and 4K Ultra-High Definition (UHD), and to scale the input video stream to an output video stream at 8K UHD resolution via the N parallel image scalers.

5. The video processor of claim 1, comprising logic and circuitry to receive an input video stream at 8K UHD resolution, and to downscale the image to a lower resolution via the N parallel image scalers.

6. The video processor of claim 1, wherein the image scaling algorithm includes a linear interpolation.

7. The video processor of claim 1, wherein the image scaling algorithm includes a higher order interpolation.

8. The video processor of claim 6, wherein vertical slices representing substantially a first, second, and third quartile include three first pixels from a succeeding slice, and vertical slices representing second, third, and fourth quartiles include three last pixels from a preceding slice.

9. The video processor of claim 1, wherein the N image scalers are pipelined.

10. The video processor of claim 1, wherein the output image is a frame of a high-definition multimedia interface (HDMI)-compatible video stream.

11. The video processor of claim 9, wherein the input image is a frame of a high-definition multimedia interface (HDMI)-compatible video stream.

12. An intellectual property (IP) block comprising the video processor of claim 1.

13. A system-on-a-chip (SoC), comprising:
   circuitry to receive an input image;
   an image slicer to divide the input image into a plurality of N slices;
   N image scalers disposed to scale the N slices in parallel, and including an interpolator circuit to interpolate intermediate pixels between pixels in the input image; and
   an output multiplexer to multiplex scaled vertical slices into a combined scaled output image.

14. The SoC of claim 13, further comprising N input de-rasterization buffers to receive the input image at 1/Nth of pixel rate; and a re-rasterization buffer to collect the N scaled slices and output them at a pixel rate of 1.

15. The SoC of claim 13, wherein the interpolator circuit includes a higher order interpolator, and wherein at least some of the vertical slices include three last pixels from a preceding slice.

16. The SoC of claim 13, further comprising:
a high-definition multimedia interface (HDMI) receiver to receive an input HDMI video stream;
a DSC decompressor to decompress the HDMI video input and to extract the input image;
a DSC compressor to receive the output image and to encode the output image into a scaled output HDMI video stream; and
an HDMI transmitter to transmit the scaled output HDMI video stream.

17. A method of scaling an image, comprising:
receiving an input image;
slicing the input image into a plurality of N slices;
raster-based scaling, in parallel, the N slices according to an image scaling algorithm; and
combining scaled vertical slices into a combined scaled output image.

18. The method of claim 17, further comprising receiving extracting the input image from an input video stream.

19. The method of claim 17, further comprising upscaling an image to 8K UHD resolution or downscaling the image from 8K UHD resolution.

20. The method of claim 19, wherein the image scaling algorithm includes a quadratic interpolation, and wherein at least some of the vertical slices include one or more last pixels from a preceding slice.

* * * * *